Figure 1:
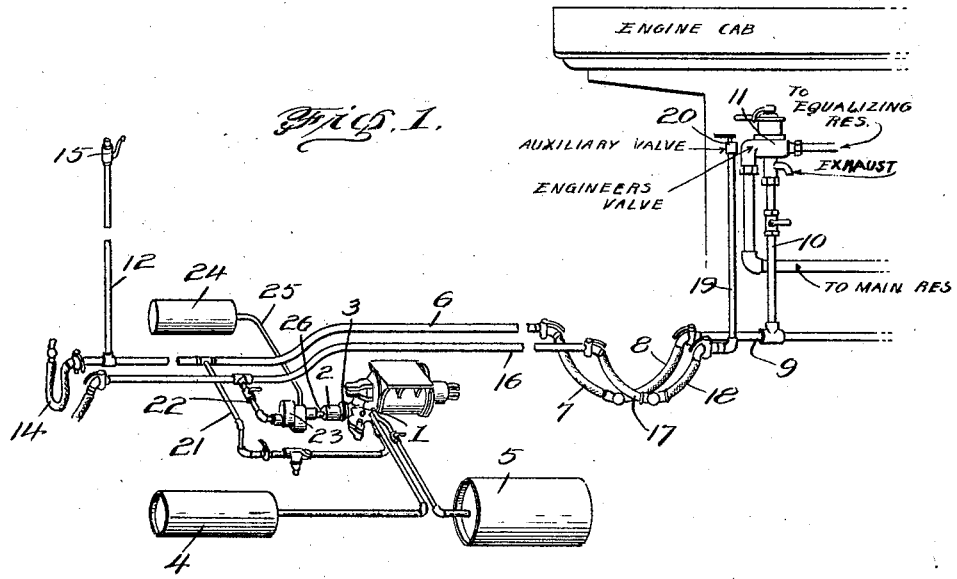

March 16, 1926.  1,577,424
H. SCHMARGE
AIR BRAKE QUICK EMERGENCY CONTROL SYSTEM
Filed Sept. 12, 1925  2 Sheets-Sheet 1

Inventor
Henry Schmarge.

By John C. Brady
Attorney

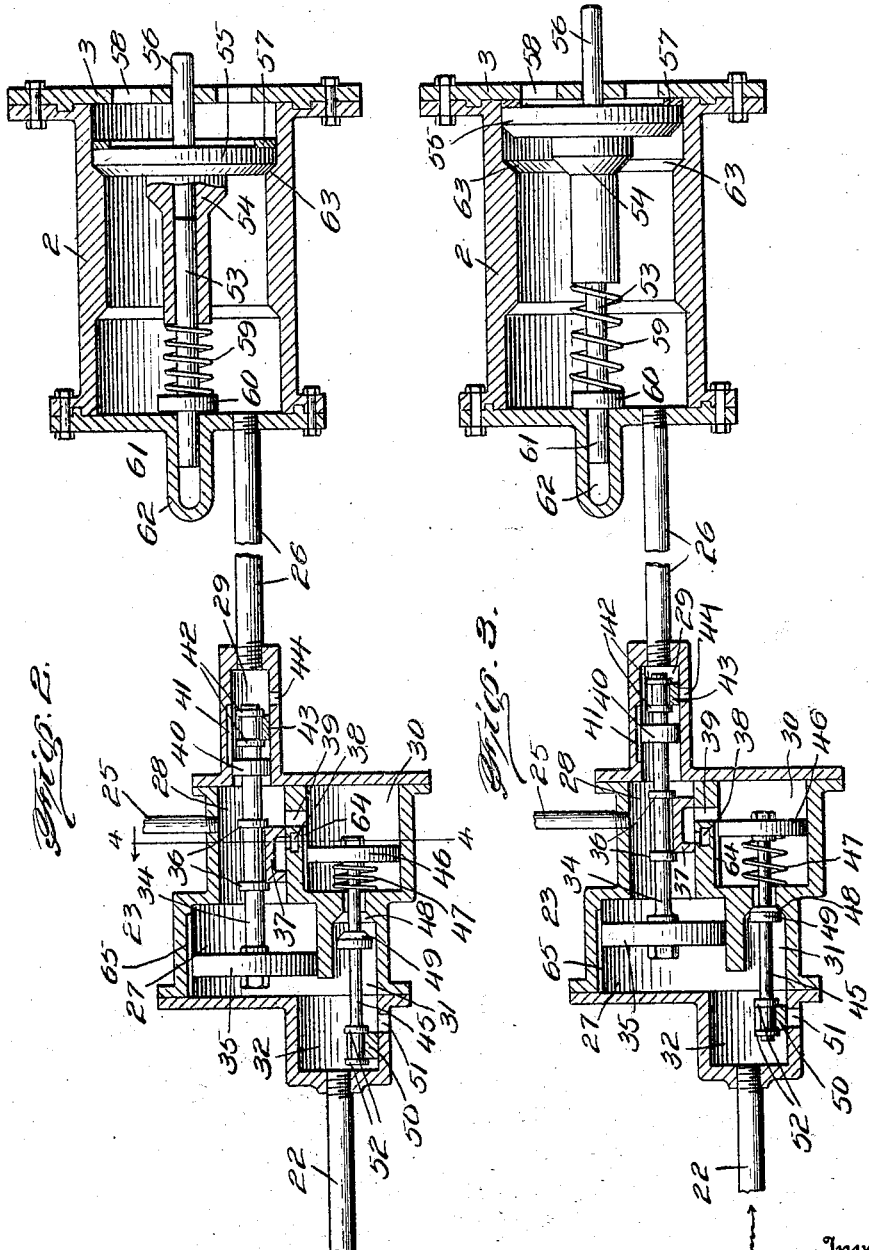

Patented Mar. 16, 1926.

1,577,424

UNITED STATES PATENT OFFICE.

HENRY SCHMARGE, OF BELEN, NEW MEXICO.

AIR-BRAKE QUICK EMERGENCY CONTROL SYSTEM.

Application filed September 12, 1925. Serial No. 56,037.

*To all whom it may concern:*

Be it known that I, HENRY SCHMARGE, a citizen of the United States, residing at Belen, in the county of Valencia and State of New Mexico, have invented certain new and useful Improvements in an Air-Brake Quick Emergency Control System, of which the following is a specification.

My invention relates broadly to air brake systems and more particularly to a quick emergency control system for air brakes.

One of the objects of my invention is to provide an air brake system wherein the service operation and the emergency operation of the air brake are independent of each other and wherein undesired emergency action can be eliminated for the elimination of kickers and the inherent destructive results thereof to equipment and loading.

Another object of my invention is to provide a positive quick action control system for air brakes whereby quick emergency operation of the system can be assured at all times.

Still another object of my invention is to provide a valve system for air brake installations by which local reduction of pressure by propagation at each triple valve may be rapidly secured for permitting the triple valve to move to emergency position.

A further object of my invention is to provide a construction of quick action valve system which may be applied to air brake equipment for eliminating undesired emergency action of triple valves but permitting quick action without inertia or delay when such quick action is required.

My invention relates more particularly to an air brake system of the kind set forth in Letters Patent 1,541,663 granted to me June 9, 1925, and as shown in my copending application Serial No. 32,769, filed May 25, 1925. In this air brake system I provide an auxiliary pipe line which parallels the main pipe line and through which pressure is normally introduced from a suitable pressure source such as the usual air compressor for operating auxiliary mechanism attached to the triple valve for preventing undesired emergency action thereof. When emergency action of the triple valve is desired the pressure in the auxiliary pipe line is reduced by valve mechanism located adjacent or forming a part of the engineer's valve which controls the main pipe line. It is necessary that the pressure in the auxiliary pipe line be rapidly reduced to permit movement of the triple valve to emergency position. By my present invention I provide a valve mechanism wherein local reduction of pressure by propagation is instantly insured upon release of pressure in the auxiliary pipe line, permitting free travel of the triple valve to emergency position without delay.

Figure 4:
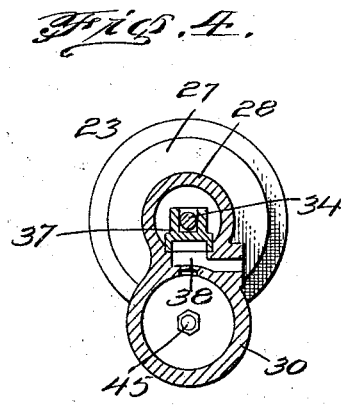

My invention will be more clearly understood from the following specification by reference to the accompanying drawings, in which:

Figure 1 is a diagrammatic view illustrating the arrangement of an air brake system equipped with the valve mechanism of my invention; Fig. 2 is a cross-sectional view through the quick action emergency control valve mechanism and showing the arrangement thereof in relation to the restricting cylinder on the triple valve, where the parts of the valve mechanism are shown in position where pressure has been reduced and the triple valve is free to move into emergency position; Fig. 3 is a cross-sectional view through the valve mechanism illustrated in Fig. 2 where the valve parts are shown in closed position and the triple valve prevented from moving to emergency position; and Fig. 4 is a cross sectional view taken through the quick action emergency control valve structure on line 4—4 of Fig. 2.

Referring to the drawings in more detail, reference character 1 designates the triple valve of an air brake system to which is secured a restricting cylinder 2 by means of flanges 3. Reservoirs 4 and 5 are employed in conjunction with the triple valve mechanism. The main pipe line 6 connects through pipe line 21 with the triple valve 1 and extends from car to car in the train with couplings 7, 8 and 14 interconnecting the pipe lines to the several cars. The pipe line 9 in the engine cab has riser 10 extending therefrom to which the engineer's valve 11 is connected for controlling the operation of the air brake system. The main pipe line 6 may be provided with risers 12 on the various cars and suitable conductor valves 15 as is usual in air brake practice. I provide an auxiliary pipe line 16 which parallels the main pipe line 6 and connects through variable couplings 17 and 18 with riser 19 in the engine cab to which is connected the auxiliary valve 20 adjacent the engineer's valve. The restricting cylinder 2 is supplied with pressure from the auxiliary pipe line 16 through pipe line 22, quick emergency control valves 23, and pipe line 26. Reservoir 24 is provided and connected with the valve mechanism 23 through pipe line 25 for securing quick action in the local reduction in pressure in the auxiliary pipe line 16, by local propagation as will be hereinafter described in more detail.

The improved valve structure 23 by which quick emergency operation of the triple valve is insured is more clearly shown in Figs. 2 and 3 where a main casting provides separate control cylinders 27, 28, 29, 30, 31 and 32. A slide valve 37 is reciprocated by piston rod 34 and held in position by means of lug members 36 on the piston rod between the operating piston 35 and the obstruction piston 40. The slide valve is under-cut forming an extended cavity arranged to govern ports 38 leading to the atmosphere as more clearly shown in the cross sectional view in Fig. 4 and port 39 leading to cylinder 30 wherein operating piston 46 reciprocates. The slide valve 37 has a bridge portion which may close port 39 with respect to port 38 as indicated in Fig. 2, or may open port 39 with respect to port 38 leading to the atmosphere as represented in Fig. 3. A piston rod 45 connected to operating piston 46 carries a small piston 49 and a slide valve 50 positioned between guide lugs 52 and arranged to cooperate with port 51 in one side of cylinder 32. The piston 49 is tapered to make firm contact with a ground joint 48 in the wall of cylinder 31. The piston 49 may be suitably packed to insure a firm and solid joint. The piston rod 45 carrying the slide valve 50 and pistons 46 and 49 thereon is moved in one direction under pressure and in the opposite direction by spring 47. A feed groove 41 is provided in the upper wall of cylinder 29 cooperating with piston member 40 for enabling the air from the auxiliary pipe line 16 to feed through pipe line 22 and charge the reciprocating cylinder 2. In cylinder 30 there is provided a feed groove 64, the size of which depends upon the length of time the slide valve 50 remains open, for when the pressure becomes built up in back of piston 46 the spring 47 will move the piston 46 back to the beginning of its stroke and at the same time seat piston 49 in seat 48 and close the exhaust port 51 by means of slide valve 50. The restricting cylinder 2 is secured to the triple valve 1 by means of coupling plate 3 and contains a piston 55 therein with an extended head 56 thereon which is moved to a position to obstruct the travel of the piston of the triple valve by charging restricting cylinder 2 with air under pressure for preventing movement of the piston in the triple valve to emergency position. It will be observed that the valve structure and restricting cylinder construction as described herein may be applied to standard air brake equipment for controlling the operation of the triple valve. The movement of the triple valve to emergency position at undesired times may cause side sweeping of the train and the buckling of two or more cars with damage and destruction to equipment and loading, delays to trains and danger to trains operating on double tracks. The apparatus will permit the emergency application of the brakes at times only when such emergency action may be desired and often a later emergency application may prevent an accident when at first such emergency application might not be considered necessary. With present freight train brakes now available, no emergency application of the brakes can be had after the triple valve is moved to service position. The valve system herein described may be adapted to present brake equipment for the reason that it is only necessary to secure restricting cylinder 2 in position in lieu of the triple valve cylinder head. The piston 55 fits against a ground joint or shoulder 63 within the restricting cylinder 2 and is provided with a gasket 57 at the opposite side thereof for making a tight joint with respect to the triple valve cylinder when the piston 55 is moved to the position shown in Fig. 3. Graduating stem 53 fits into socket 54 which is secured to the rear of piston 55 with respect to which piston 55 may reciprocate against the pressure of the graduating spring 59. An abutment 60 is secured to the graduating stem 53 adjacent the end portion 61 which fits into a socket 62 in the cylinder head. The pipe line 26 interconnects the restricting cylinder with the emergency control valve 23. The control valve 23 has a feed groove 65 in one wall of the cylinder portion 27 which normally permits air from the pipe line 22 to feed past the operating piston 35 through cylinder 28 and charge the reservoir 24 through pipe line 25 and then feed through feed groove 41 past obstruction piston 40 for charging the restricting cylinder 2 as represented clearly in Fig. 3. In the charging position illustrated in Fig. 3 the air pressure is effectively applied against piston 55 stored in reservoir 24 preventing the triple valve from moving to emergency position by reason of the obstruction offered by the extension 56 on piston 55.

When the auxiliary valve 20 is actuated to enable the triple valve to move to emergency position, pressure is released in pipe line 22 below the normal pressure in reservoir 24. The local pressure in reservoir 24 is then propagated to pipe line 25 and acts against piston 35 forcing piston rod 34 to the left to a position represented in Fig. 2 moving slide valve 43 to open port 44 to the atmosphere and releasing air from restricting cylinder 2. Port 39 is simultaneously uncovered by movement of slide valve 37 as represented in Fig. 2, admitting air under pressure to cylinder 30 from reservoir 24 and moving piston 46 against the action of spring 47, moving piston 49 from its seat 48, and uncovering port 51 by movement of slide valve 50, whereupon pressure in pipe line 22 is still further reduced with extreme rapidity. In this manner pressure is instantly reduced in pipe lines 22 and 26 by simultaneously uncovering ports connected with each of these lines. The feed groove 64 in the cylinder 30 permits air to feed past piston 46 during the time that slide valve 50 uncovers port 51 and as soon as the pressure equalizes on both sides of piston 46 the spring 47 forces the valve 50 closed and the system may be recharged by pressure being built up in the auxiliary pipe line 16 through pipe line 22.

It will be observed that the system herein described permits the reduction in pressure in the restricting cylinder which is dependent only upon pipe friction which is substantially negligible.

While I have described my invention in certain preferred embodiments, I desire that it be understood that modifications may be made and that I intend no limitations upon the invention other than those imposed by the scope of the appended claims.

What I claim and desire to secure by Letters Patent of the United States is as follows:—

1. An air brake system comprising in combination a triple valve, a main pipe line for supplying air under pressure to said triple valve, means secured to said triple valve for preventing undesired emergency operation thereof, an auxiliray pipe line for supplying air under pressure to said means and a double acting valve interposed between said means and said auxiliary pipe line for securing local reduction in pressure in said means and in said auxiliary pipe line by propagation immediately upon positive reduction in pressure in said auxiliary pipe line for permitting emergency operation of said triple valve.

2. An air brake system comprising in combination a triple valve, a main pipe line for supplying air under pressure to said triple valve, a restricting cylinder secured to said triple valve and having means therein for preventing undesired quick action of said triple valve, an auxiliary pipe line and a double acting valve interposed between said auxiliary pipe line and said restricting cylinder for controlling the supply of air under pressure to said restricting cylinder and having means whereby the air pressure in said restricting cylinder and said auxiliary pipe line may be locally reduced immediately upon reduction in pressure in said auxiliary pipe line.

3. An air brake system comprising in combination a triple valve, a main pipe line for supplying air under pressure to said triple valve, a restricting cylinder secured to said triple valve, an operating piston therein for preventing undesired emergency action of said triple valve, an auxiliary pipe line for supplying air under pressure to said restricting cylinder for controlling the movement of said operating piston, and a compound valve interposed between said auxiliary pipe line and said restricting cylinder and having means for reducing the pressure in both said auxiliary pipe line and said restricting cylinder simultaneously by local propagation upon reduction in pressure in said auxiliary pipe line.

4. An air brake system comprising in combination a triple valve, a main pipe line for supplying air under pressure to said triple valve, a restricting cylinder secured to said triple valve, an operating piston therein for preventing undesired emergency action of said triple valve, an auxiliary pipe line for supplying air under pressure to said restricting cylinder for controlling the movement of said operating piston, a local reservoir arranged to be charged with air from said auxiliary pipe line and a compound valve mechanism interposed between said auxiliary reservoir and said auxiliary pipe line and said restricting cylinder and arranged to reduce the pressure in both said auxiliary pipe line and said restricting cylinder by local propagation from said reservoir immediately upon reduction in pressure in said auxiliary pipe line.

5. An air brake system comprising in combination a triple valve, a main pipe line for supplying air under pressure to said triple valve, a restricting cylinder secured to said triple valve, an operating piston therein for preventing undesired emergency action of said triple valve, an auxiliary pipe line for supplying air under pressure to said restricting cylinder for controlling the movement of said operating piston, a feed pipe connected with said auxiliary pipe line, and means interposed between said feed pipe and said restricting cylinder for releasing the air under pressure at points adjacent the restricting cylinder and the connection of said feed pipe with said auxiliary pipe line immediately upon reduction in pressure in said auxiliary pipe line for permitting said triple valve to move to emergency position.

6. An air brake system comprising in combination a triple valve, a main pipe line for supplying air under pressure to said triple valve, an operating piston therein for preventing undesired emergency action of said triple valve, an auxiliary pipe line for supplying air under pressure to said restricting cylinder for controlling the movement of said operating piston, a feed pipe connected with said auxiliary pipe line and a valve mechanism interposed between said feed pipe and said restricting cylinder, said valve mechanism including a pair of cylinders arranged adjacent each other, independent piston rods arranged therein with pistons and slide valves carried thereon, one of said piston rods being slidable upon reduction in pressure in said auxiliary pipe line for effecting a corresponding movement of said other piston rod for reducing air pressure in said feed pipe and in said restricting cylinder for enabling said triple valve to move to emergency position.

In testimony whereof I affix my signature.

HENRY SCHMARGE.